United States Patent [19]

Buckley

[11] Patent Number: 4,766,694
[45] Date of Patent: Aug. 30, 1988

[54] PORTABLE ANIMAL TRAP HOLDER

[76] Inventor: Carl W. Buckley, P.O. Box 100, White Heath, Ill. 61884

[21] Appl. No.: 130,102

[22] Filed: Dec. 7, 1987

[51] Int. Cl.$^4$ .......................................... A01M 23/26
[52] U.S. Cl. ...................................................... 43/96
[58] Field of Search ........................... 43/96, 88, 89, 58

[56] References Cited

U.S. PATENT DOCUMENTS

| 587,255 | 7/1897 | Anderson | 43/88 |
| 4,517,762 | 5/1985 | Venetz | 43/96 |
| 4,720,934 | 1/1988 | Gompers | 43/96 |

FOREIGN PATENT DOCUMENTS

| 867032 | 3/1971 | Canada | 43/96 |
| 0182556 | 5/1986 | European Pat. Off. | 43/58 |
| 2544586 | 10/1984 | France | 43/58 |

Primary Examiner—Kurt Rowan
Attorney, Agent, or Firm—Willian Brinks Olds Hofer Gilson & Lione Ltd.

[57] ABSTRACT

There is disclosed a portable trap holder for use with a body type animal trap. This type of trap generally has a spring arm which biases a pair of hinged trap jaws toward a closed position, a trigger for releasably holding the trap jaws in an open position, and means for anchoring the trap. The portable holder of the invention includes a box with a bottom, top, two opposing sides, and at least one open end. The open end is of sufficient dimensions to receive the trap jaws while in the open position. A notch is included in one of the two opposing sides, adjacent to the open end, and about midway between the top and bottom. This notch is adapted to receive the spring arm of the body type animal trap. When the spring arm is received into the notch, the trap jaws, while in the open position, lie in a plane generally parallel to the plane of the open end of the box, and, while in the closed position, lie in a plane generally perpendicular to the plane of the open end of the box.

19 Claims, 2 Drawing Sheets

PORTABLE ANIMAL TRAP HOLDER

BACKGROUND OF THE INVENTION

The present invention relates to the field of animal trapping. More particularly, the present invention relates to holders for body type animal traps.

Body type animal traps, also called cubby traps, are well known in the trapping area. One particular example of such a trap is manufactured by the VICTOR Company under the model numbers "210" or "110." Body type animal traps generally include a pair of trap jaws which are generally square shaped and hingedly connected to each other at the midpoint of two opposite sides (see FIGS. 1 and 3). These trap jaws are biased by a spring arm toward a closed position wherein each of the non-connected sides of each jaw is contacting a non-connected side of the other jaw. A trigger is provided for releasable holding the trap jaws in an open position, i.e. wherein the jaws are rotated 90 degrees against the bias of the spring arm to a point where each of the unconnected sides of the trap jaws contacts another unconnected side of the other trap jaw. Typically the trigger will extend into the space between the trap jaws when in the open position. Thus, an animal passing through hits the trigger and the trap jaws spring closed, thus crushing the animal. The body type trap also includes an anchoring means which is generally a chain attached to the spring arm with a ring on the end.

When using this type of trap, it is customary to construct a "cubby" for the trap (See FIG. 1). This cubby consists of two rows of sticks driven into the ground, thereby creating a passageway. The cubby is necessary to hold the trap upright and to direct the animal through the passageway so that it hits the trigger. In addition to constructing the cubby, it is also necessary to pound a stake into the ground for anchoring the trap. This is typically accomplished by placing the ring on the end of the chain over the anchoring stake.

Although the use of body type traps is quite popular, there are a number of disadvantages associated with their use. For one thing, it is time-consuming to gather the sticks needed to construct the cubby. In the alternative, it is cumbersome to carry the sticks out to the site for the trap. Also, it is time-consuming to construct a cubby at each location where the animal trap will be used. Finally, it is difficult, if not impossible, to construct a cubby or drive in an anchoring stake when the ground is frozen, or covered with deep snow.

SUMMARY OF THE INVENTION

The present invention is a portable trap holder for use with a body type animal trap. As stated above, this type of trap generally has a spring arm which biases a pair of hinged trap jaws toward a closed position, a trigger for releasably holding the trap jaws in an open position, and means for anchoring the trap. The portable holder of the present invention includes a box with a bottom, top, two opposing sides, and at least one open end. The open end is of sufficient dimensions to receive the trap jaws while in the open position. A notch is included in one of the two opposing sides, adjacent to the open end, and about midway between the top and bottom. This notch is adapted to receive the spring arm of the body type animal trap. When the spring arm is received into the notch, the trap jaws, while in the open position, lie in a plane generally parallel to the plane of the open end of the box, and, while in the closed position, lie in a plane generally perpendicular to the plane of the open end of the box.

In a preferred embodiment of the present invention, the portable trap holder also includes a leg means for connecting the animal trap to the holder. The preferred leg means includes a horizontal portion affixed to the top of the box and a vertical portion extending from the horizontal portion to the surface upon which the trap holder is placed. This vertical portion is made to pass through the coil of the body type trap. Also in this preferred embodiment, the horizontal portion includes a slot and the horizontal portion is affixed to the top of the box by a releasable fastening means which passes through the slot. As a result, the leg means can be swung and extended into various positions to allow the user freedom when setting up the trap. In particular, the leg means can be used on either the right or the left side of the box.

In accordance with another preferred embodiment, the portable trap holder includes two open ends and can thus be used to hold two body type animal traps at once. Preferably, the second open end can be closed off, to convert the box into a single trap holder.

As can be seen, the present invention provides decided advantages over the prior art method of using a body type animal trap. Perhaps the most important advantage is the fact that the portable trap holder of the present invention allows a trapper to use a body type animal trap when the ground is frozen or covered with snow. Naturally, this is important for trapping certain kinds of animals in northern climates.

The portable holder of the present invention also eliminates the need for gathering or transporting sticks to construct the cubby. In addition, the time to construct the cubby is saved by using the present invention.

These and other advantages will become apparent upon reading the following detailed description in conjunction with the attached drawings.

DETAILED DESCRIPTION OF THE PREFERRED EMBODIMENTS

Figure 1:
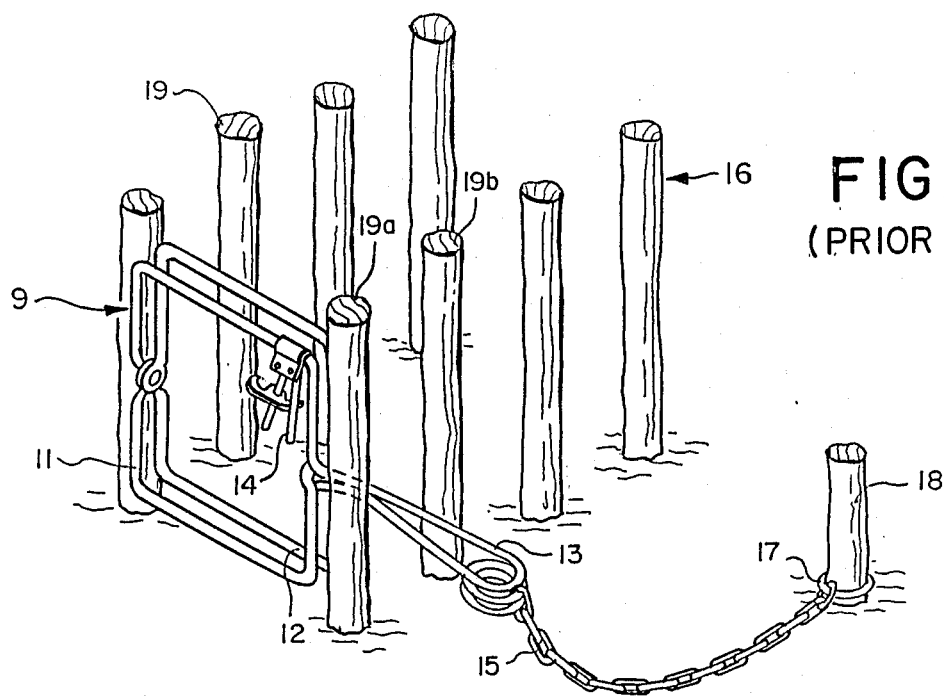
FIG. 1 is a perspective view of the prior art set up for holding a body type animal trap.

Referring to the drawings, FIG. 1 shows the typical prior art method of setting up a body type animal trap. As shown, the body type trap 9 consists of two square shaped jaws 11 and 12 which are hinged together at the midpoint of two of their sides. In the open position, each of the non-connected sides of the jaws are adjacent to one of the non-connected sides of the other jaw.

The spring arm 13 operates to bias both of these jaws to rotate away from each other 90 degrees into the closed position for the trap, i.e. where each of the non-connected sides is brought into contact with the other non-connected side of the other jaw.

In prior art uses of this type of trap, a cubby 16 has been constructed by driving two rows of sticks 19 into the ground so as to create a passageway through which the animal can be led. Two of the sticks, 19a and 19b, are also used to support the body type trap in an upright position by virtue of the fact that the spring arm 13 passes between them and thus leans on one or the other of the sticks 19a and 19b.

In this prior art use, another stick 18 is driven into the ground so as to facilitate anchoring the trap. This is done by placing the ring 17 over the stake 18. This ring 17 is connected by the chain 15 to the spring arm 13. Naturally, to construct this setup, one would either have to gather these sticks in the vicinity or carry them to the trapping site. Also, this setup is difficult, if not impossible, to construct when the ground is frozen or covered with deep snow.

Figure 2:
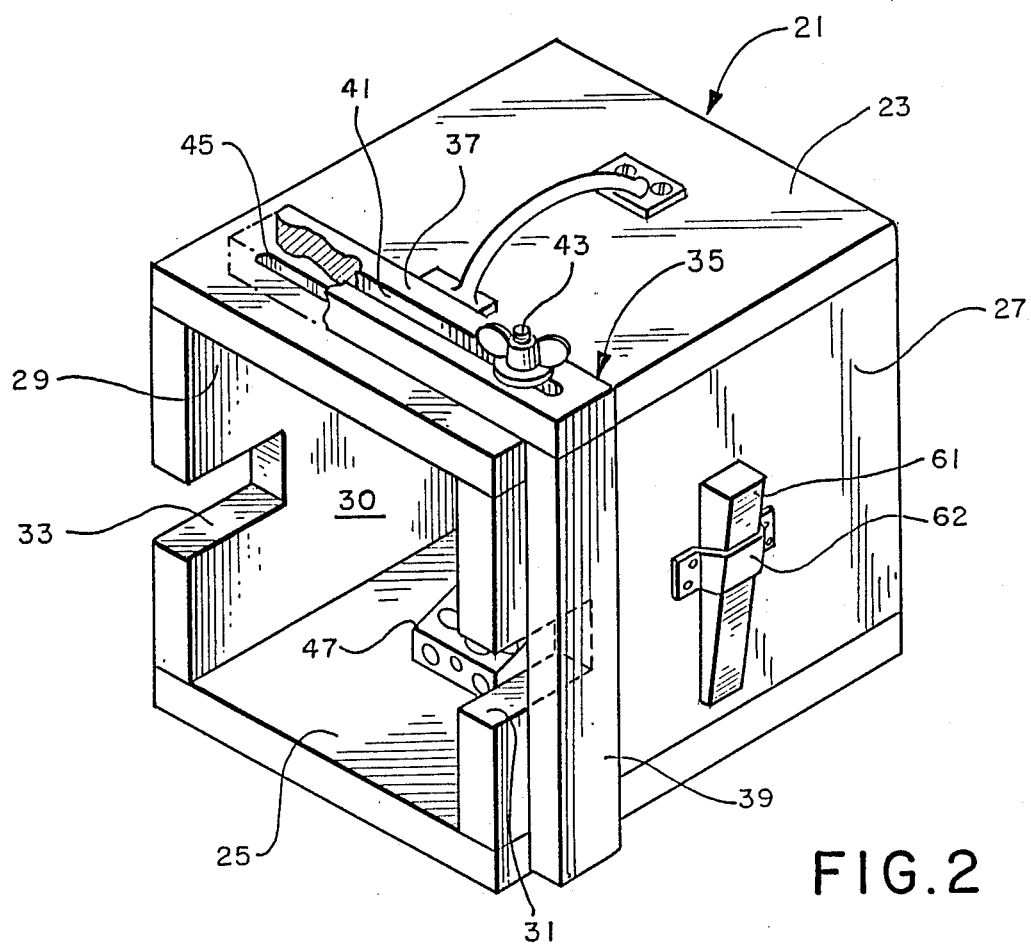
FIG. 2 is a perspective view of a preferred embodiment of the present invention.
Figure 4:
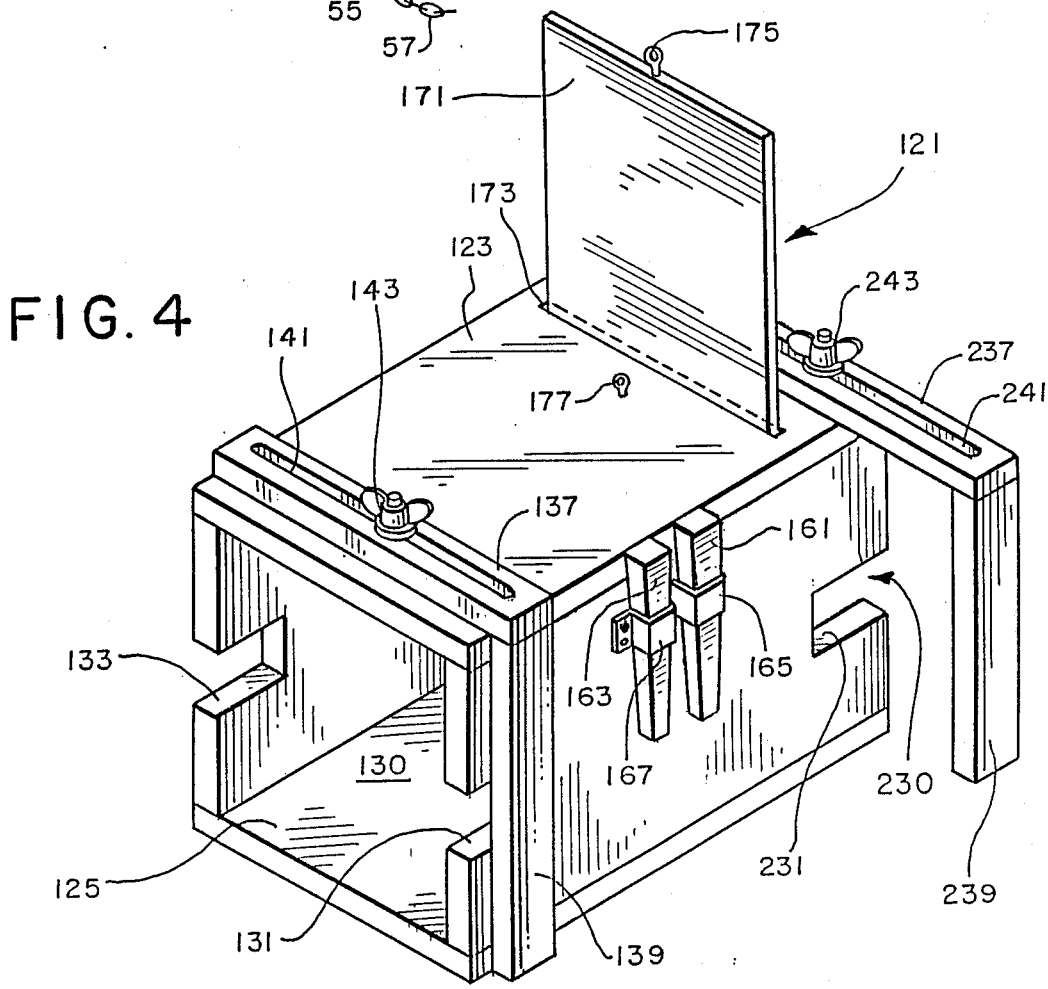
FIG. 4 is a perspective view of another preferred embodiment of the present invention which includes two open ends.

FIG. 2 shows a preferred embodiment of the present invention. The portable holder 21 includes a box with a top 23, a bottom 25 and two opposing sides 27 and 29. This embodiment includes a closed end (not shown) and an open end 30. FIG. 4 shows another preferred embodiment with two open ends. The box can be made from any suitable material. Preferably, the box is made from ¾" plywood and measures 15 inches in length, 11 inches in height, and 10 inches in width. These dimensions are preferred for the VICTOR "210" body type animal trap. Changing the dimensions to fit other brands or sizes of body type traps is certainly within the skill in the art.

Figure 3:
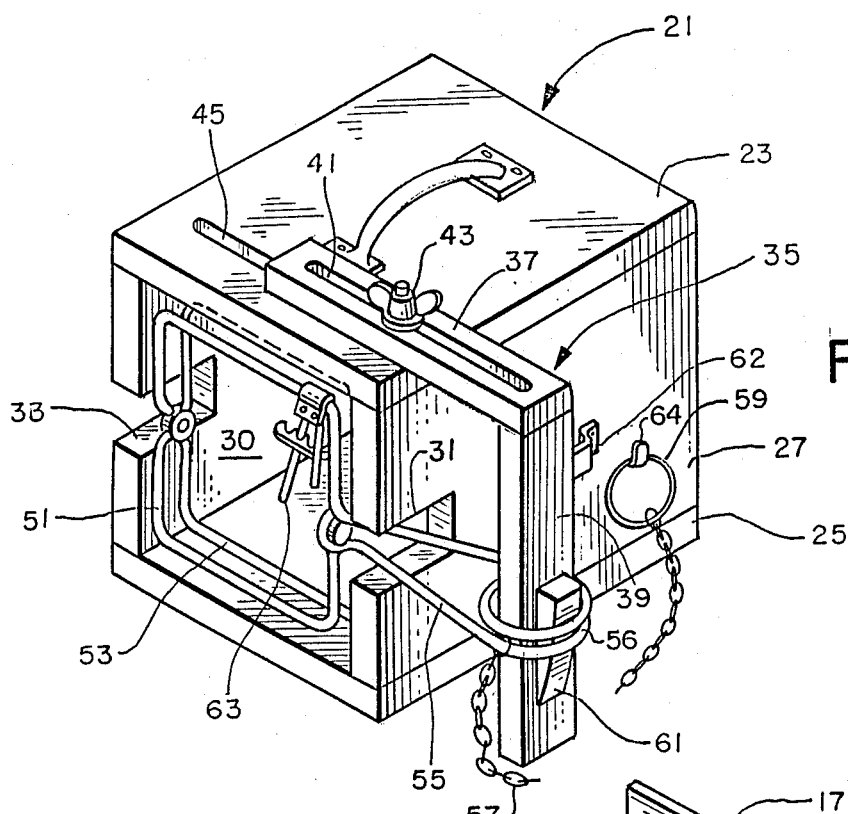
FIG. 3 is a view similar to FIG. 2 with a body type animal trap held in place therein.

Notches 31 and 33 are cut into the sides 27 and 29 respectively. These notches are located adjacent to the open end 30 and are about midway between the top 23 and bottom 25. Most preferably, the notches are 2.5" deep and 1.75" high. As seen in FIG. 3, these notches are adapted to receive the spring arm 55 of the body type animal trap. When so received, the jaws 51 and 53 (shown in the open position) of the body type trap are received into the open end 30 of the box and the body type trap is supported in its upright position. In particular, when in the open position, the jaws 51 and 53 generally lie in a plane parallel to the plane of the open end 30. When in the closed position (the dashed lines depict the jaws 51 and 53 in their closed position), the jaws 51 and 53 generally lie in a plane which is perpendicular to the plane of the open end 30.

As can be seen, this preferred embodiment includes notches 31 and 33 in both of the opposite sides 27 and 29. A notch in each side is preferred so that the user has the choice of which side of the box to extend the spring arm through. This ability to choose is particularly important when setting the trap next to a wall of a building or the like.

Preferably, the portable trap holder 21 also includes means for placing a lure inside the box. In the embodiment depicted, this is accomplished by attaching a 2"×2" sponge to the floor of the box. A liquid lure can be poured onto this sponge. This feature adds convenience to the portable trap holder in that the sponge can be filled with lure at the home base rather than at the trapping site.

The portable trap holder 21 preferably includes a leg means 35. The purpose of this leg means is to facilitate anchoring of the body type trap to the holder. This is accomplished in the depicted embodiment by providing a leg means 35 with a horizontal portion 37 which is affixed to the top 23 and includes a vertical portion 39 which is attached to an end of the horizontal portion which is distal from the box and extends between the horizontal portion and the surface on which the portable trap holder 21 is placed.

The horizontal portion 37 includes a slot 41 and the top 23 of the box includes a slot 45. The horizontal portion is affixed to the top 23 by a releasable fastening means, such as a bolt with a washer and a wing nut, which passes through the slots 41 and 45. As a result, the leg means 35 can be swung and extended into various positions on the left or the right side of the box. This is an advantage because it allows flexibility for the trapper, particularly when setting the trap next to a building, a fence, a log, or the like.

As shown in FIG. 2, the normal position for the leg 35 when not in use is adjacent to the box. FIG. 3 shows the leg 35 extended on the right side of the box in position for use. In particular, the leg 35 is used to anchor the body type trap by having the coil 56 of the spring arm 55 placed over it. Preferably, the coil 56 is securely maintained on the leg 35 by means of a wedge 59 which is pushed between the coil and the leg to create an interference fit. For convenience, an elastic band 62 is attached to the side 27 of the box for holding the wedge 61 when not in use.

The ring 59, which would be used in a conventional trap set-up to anchor the trap, is fastened to the side of the box 27, by a hook, or twisted wire 64.

FIG. 4 shows another preferred embodiment of the portable trap holder of the present invention. In this embodiment, the portable trap holder 121 includes two open ends, 130 and 230. The provision of two open ends allows the trapper to set a body type animal trap in each end and thereby get a double catch.

This embodiment also includes a second leg means with a horizontal portion 237 which is similarly releasably affixed to the top 123 so that it likewise can be swung and extended into various positions. This embodiment also includes a second wedge 163 for securing the coil of the second trap to the second vertical portion 239.

As shown, the open end 230 can be closed off. This is an important feature when only setting one trap, because it forces the animal through the end with the trap set in it. In the depicted embodiment, this result is accomplished by means of the board 171 which is adapted to slide through the slot 173 to thereby close the open end 230. Screwed in eyes 175 and 177 are also provided so that the board can be wired in to prevent its coming out of place.

It is thus shown that the present invention provides an improved way to use a body type animal trap. Certainly, it should be understood that various changes and modifications to the embodiments described above can be made without departing from the scope of the invention as defined by the claims appended hereto.

I claim:

1. A portable trap holder for a body type animal trap having a spring arm, hinged trap jaws biased by the spring arm toward a closed position, and trigger means for releasably holding the trap jaws in an open position, the holder comprising:
    a box with a bottom, top, two opposing sides, and at least one open end, the open end being of sufficient dimensions to receive the trap jaws in the open position;
    a notch in one of the two opposing sides adjacent to the open end and about midway between the top and bottom for receiving the spring arm of the body type animal trap;
    wherein when said spring arm is received into said notch, the trap jaws, while in the open position, lie in a plane generally parallel to the plane of the open end of the box, and, while in the closed position, lie in a plane generally perpendicular to the plane of the open end of the box.

2. The holder of claim 1 further comprising leg means affixed to the box for connecting the trap to the holder.

3. The holder of claim 2 wherein the leg means comprises a horizontal portion affixed to the top of the box and a vertical portion attached to an end of the horizontal portion which end is distal from the box, which vertical portion extends between said end of the horizontal portion and a surface upon which the holder is placed, and which vertical portion is adapted to pass through a coil portion of the spring arm.

4. The holder of claim 3 wherein the horizontal portion comprises a slot and wherein the horizontal portion is affixed to the top of the box by a releasable fastening means which passes through said slot, whereby said leg means can be swung and extended in various positions relative to the box.

5. The holder of claim 4 wherein the top of the box also comprises a slot and wherein the releasable fastening means passes through the slot in the top of the box and the slot in the horizontal portion to thereby provide for greater movement of the leg means relative to the box.

6. The holder of claim 1 further comprising a second open end and a second notch in one of the opposing sides adjacent to the second open end and about midway between the top and bottom for receiving a spring arm of a second body type animal trap.

7. The holder of claim 6 further comprising means for closing the second open end.

8. The holder of claim 7 wherein the means for closing the second open end comprises a slot in the top of the box near the second open end and a board means which passes through the slot and into the box to thereby close the second open end.

9. The holder of claim 1 further comprising a handle affixed to the top of the box to facilitate carrying the holder.

10. The holder of claim 1 further comprising means for placing a lure inside the box.

11. The holder of claim 10 wherein the means for placing a lure inside the box comprises a sponge attached to the bottom of the box.

12. A portable trap holder for a body type animal trap having a spring arm, hinged trap jaws biased by the spring arm toward a closed position, and trigger means for releasably holding the trap jaws in an open position, the holder comprising:

a box with a bottom, top, two opposing sides, and at least one open end, the open end being of sufficient dimensions to receive the trap jaws in the open position;

a notch in one of the two opposing sides adjacent to the open end and about midway between the top and bottom for receiving the spring arm of the body type animal trap;

wherein when said spring arm is received into said notch, the trap jaws, while in the open position, lie in a plane generally parallel to the plane of the open end of the box, and, while in the closed position, lie in a plane generally perpendicular to the plane of the open end of the box;

leg means for connecting the anchoring means of the animal trap to the box, the leg means comprising a horizontal portion including a slot and affixed to the top of the box by a releasable fastener passing through the slot, and a vertical portion attached to an end of the horizontal which is distal from the box, which vertical portion extends between said end of the horizontal portion and a surface upon which the holder is placed, and which vertical portion is adapted to pass through a coil portion of the spring arm.

13. The holder of claim 12 wherein the top of the box also comprises a slot and wherein the releasable fastening means passes through the slot in the top of the box and the slot in the horizontal portion to thereby provide for greater movement of the leg means relative to the box.

14. The holder of claim 12 further comprising a second open end and a second notch in one of the opposing sides adjacent to the second open end and about midway between the top and bottom for receiving a spring arm of a second body type animal trap.

15. The holder of claim 14 further comprising means for closing the second open end whereby the trap holder can be used with either one or two body type animal traps.

16. The holder of claim 15 wherein the means for closing the second open end comprises a slot in the top of the box near the second open end and a board means which passes through the slot and into the box to thereby close the second open end.

17. The holder of claim 12 further comprising a handle affixed to the top of the box to facilitate carrying the holder.

18. The holder of claim 12 further comprising means for placing a lure inside the box.

19. The holder of claim 18 wherein the means for placing a lure inside the box comprises a sponge attached to the bottom of the box.

* * * * *